United States Patent Office 3,047,142
Patented July 31, 1962

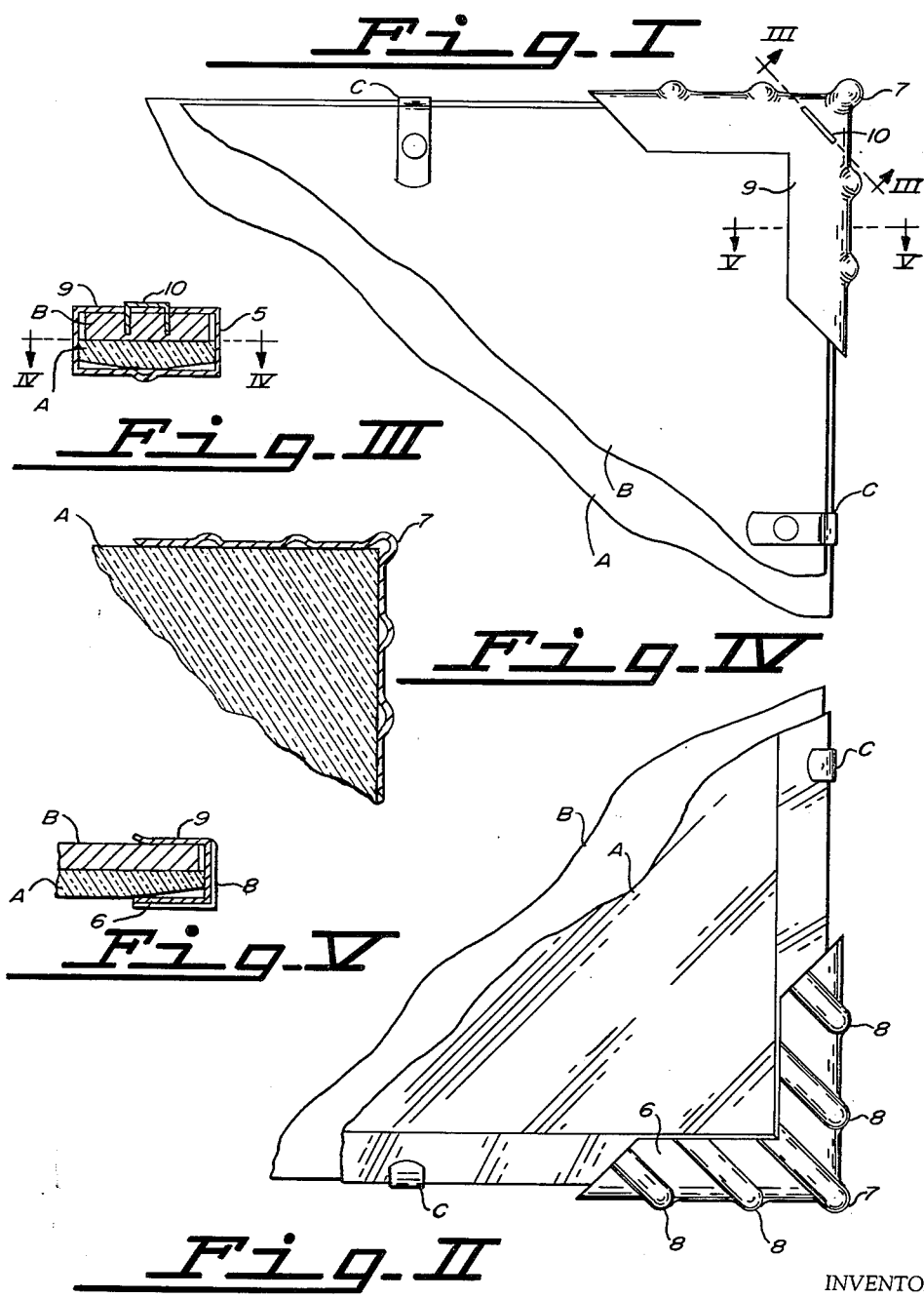

3,047,142
HOLLOW RIBBED MIRROR CORNER PROTECTOR
Howard H. Heffley, Toledo, Ohio, assignor to The Toledo Plate & Window Glass Co., Toledo, Ohio, a corporation of Ohio
Continuation of application Ser. No. 621,741, Nov. 13, 1956. This application Mar. 2, 1959, Ser. No. 800,613
3 Claims. (Cl. 206—62)

This is a continuation of application Serial No. 621,741, filed November 13, 1956.

This invention relates to means for protecting the corners of mirrors. The mirrors on which the corner protectors of this invention are used each consist of a plate of glass which may be beveled along its edges and which is silvered on the back, the silvered back being protected by a sheet of fiber board. The sheet of fiber board usually is slightly smaller than the plate of glass so that the fiber board will not show from the front when the mirror is hung.

It is an object of the invention to provide a protector for corners of mirrors of the type described above, which protector when in place on a mirror has a hollow rib extending around and out of contact with the corner of the glass plate, so that pressure and shocks received by the rib are not transmitted to the corner of the glass plate.

It is another object to provide such a corner protector in which the hollow rib extends for a short distance over the margin of the front of the glass plate.

Another object is to provide a corner protector having a flange to overlie the corner and adjacent margins of a fiber board mirror backing sheet, said flange being adapted to be fastened to said backing sheet.

Another object is to provide a corner protector such as that outlined above which is so shaped as to snugly embrace the corner of a mirror.

Still a further object is to provide such a corner protector which is molded of plastic material, e.g. artificial resin.

Other objects and numerous advantages of the invention will become apparent upon perusal of the following description illustrated by the accompanying drawings in which:

FIG. I is a fragmentary rear elevational view showing the back of a corner of a mirror to which the corner protector of this invention has been applied;

FIG. II is a fragmentary front elevational view showing the face of a corner of a mirror to which the corner protector of this invention has been applied;

FIG. III is a detail sectional view taken as indicated by the line III—III of FIG. I;

FIG. IV is a fragmentary sectional view taken as indicated by the line IV—IV of FIG. III; and FIG. V is a fragmentary sectional view taken as indicated by the line V—V of FIG. I.

The following description and the accompanying drawings are intended to describe and illustrate a preferred form of the invention but are not intended to impose limitations upon its scope.

The mirror to which the corner protector of this invention is applied comprises a plate of glass A which may be beveled along the margins of its face and to the back of which a reflective coating (not shown) of silver or other material is applied. The mirror also comprises a backing sheet B of fiber board or the like, the dimensions of which are slightly less than the dimensions of the glass plate so that the fiber board backing sheet will not show from the front when the mirror is hung.

Riveted at intervals along the margin of the backing sheet B are hooks C which extend around the edges of the backing sheet and the glass plate to hold them in assembled relation.

While the backing sheet protects the reflective coating of silver or the like from scratching and other damage, it affords no protection to the corners or edges of the glass plate, the apices of the corners being particularly vulnerable. In handling heavy mirrors workmen are liable to rest them on their corners and even to pivot them on their corners. Chipping the corner of a beautiful, expensive mirror ruins it.

Means for protecting corners of mirrors have heretofore been devised, the means most commonly used consisting of a folded piece of corrugated paper board, usually with a splice that makes the folded paper board protector weakest at the apex of the corner where protection is most needed. Corner protectors also have been made of metal strips which were precariously held in place by wrapping paper and would fall away if the wrapping were torn or removed. While metal corner protectors are practical for use on bundles of sheet metal, wall board and other nonfrangible sheets, metal protectors are liable to themselves inflict damage upon a notch sensitive plate of glass.

The device of the applicant's invention is a generally V-shaped structure (preferably an integral molding of plastic material, e.g., a polyvinyl or a phenolic compound) having an edge embracing strip 5 which fits around the corner of the mirror and a front flange 6 which overlies the face of marginal portions of the glass plate adjacent its corner. The front flange 6 and the embracing strip 5 have a hollow rib 7 formed therein at the apex of the V-shaped structure. When the protector is in place on a mirror the hollow rib 7 projects beyond the intersecting planes of the plate forming a support leg for the plate and further forms a pocket into which the apex of the mirror corner extends without being in contact with the interior of the rib.

Additional hollow ribs 8 extend over the edges of the glass plate A and all of the ribs 7 and 8 overlie the margin of the face of the glass plate. Hence, when the mirror is laid face down upon a flat surface or faces a flat surface inside of a box the ribs 7 and 8 hold the face of the glass plate spaced from the flat surface, thus reducing the liability of damage. Similarly the ribs 7 and 8 where they extend around the edges of the glass plate hold the edges of the glass plate away from any contiguous straight surface such as a wall or the interior of a box.

The corner protector has a flat back flange 9 which engages and overlies the margins of the fiber board B adjacent the corner thereof. The edge of the back flange 9 is flared slightly outwardly to facilitate slipping the corner protector into place, see FIG. V. The corner protector is designed to fit snugly upon the corner of the mirror and being slightly resilient it will remain in place temporarily. To fasten it securely in place a staple 10 is pushed through the back flange 9 and into the fiber board by means of a well known type of stapling device. The structure of the corner protector where the staple is applied adjacent the apex is so rigid that the pressure or blow is taken by the rib 7 and transferred to the surface upon which the corner protector rests without liability of breaking the glass plate.

The appearance of the corner protector is enhanced by the ribs 7 and 8 and its neatness when in place contrasts strikingly with the ugliness of corner protectors heretofore used. It is sufficiently ornamental to be left in place while the mirror is on display by a merchant and in some cases even after the mirror is hung.

The form of device described above and illustrated in the accompanying drawings is exemplary only and is subject to modification within the spirit and scope of the subjoined claims.

Having described the invention, I claim:

1. A corner protector for mirrors or like articles comprising a generally V-shaped structure adapted to fit around the corner of a mirror or like article consisting of a glass or other frangible plate assembled with a backing sheet, said V-shaped structure having an edge embracing strip and a front flange to overlie the face of the corner and adjacent marginal portions of such glass plate, there being a hollow rib formed in said edge embracing strip and front flange at the apex of said V-shaped structure, said hollow rib projecting beyond the intersecting planes of the plate and forming a supporting leg for the plate when said corner protector is in place on such mirror, said structure also having a back flange to overlie the corner and adjacent marginal portions of such backing sheet, whereby said corner protector is adapted to be reliably attached to but readily removed from an individual mirror and to protect the corner of such individual mirror against damage both when packaged and when unpackaged, said corner protector having additional hollow ribs that are formed in the edge embracing strip and front flange and are parallel to the hollow rib that is formed at the apex of the V-shaped structure.

2. A corner protector for mirrors or like articles comprising a generally V-shaped structure adapted to fit around the corner of a mirror or like article consisting of a glass or other frangible plate assembled with a backing sheet, said V-shaped structure having an edge embracing strip and a front flange to overlie the face of the corner and adjacent marginal portions of such glass plate, there being a hollow rib formed in said edge embracing strip and front flange at the apex of said V-shaped structure, said hollow rib projecting beyond the intersecting planes of the plate and forming a supporting leg for the plate when said corner protector is in place on such mirror, said structure also having a back flange to overlie the corner and adjacent marginal portions of such backing sheet whereby said corner protector is adapted to be reliably attached to but readily removed from an individual mirror and to protect the corner of such individual mirror against damage both when packaged and when unpackaged, said corner protector having additional hollow ribs that are formed in the edge embracing strip and front flange and are parallel to the hollow rib that is formed at the apex of the V-shaped structure, said corner protector being molded of plastic material.

3. A corner protector for mirrors or like articles comprising a generally V-shaped structure adapted to fit around the corner of a mirror or like article consisting of a glass or other frangible plate assembled with a backing sheet, said V-shaped structure having a corner embracing strip and a front flange integral therewith and extending at substantially right angles thereto to overlie the face of the corner and adjacent marginal portions of such glass plate, said structure also having a back flange integral therewith and extending substantially parallel to said front flange to overlie the corner and adjacent marginal portions of such backing sheet, there being a hollow rib formed in said corner embracing strip at the apex thereof, said hollow rib projecting beyond the apex of said edge embracing strip and the intersecting planes of the plate and forming a supporting leg for the plate into which the corner of said plate may extend when said corner protector is in place on such mirror, whereby said corner protector is adapted to be reliably attached to but readily removed from an individual mirror and to protect the corner of such individual mirror against damage both when packaged and when unpackaged.

References Cited in the file of this patent

UNITED STATES PATENTS

| | | |
|---|---|---|
| 437,949 | Talcott | Oct. 7, 1890 |
| 1,655,452 | Ament | Jan. 10, 1928 |
| 1,865,485 | Sas | July 5, 1932 |
| 1,998,515 | Miller | Apr. 23, 1935 |
| 2,204,862 | Lehman | June 18, 1940 |
| 2,266,181 | Epps | Dec. 16, 1941 |
| 2,377,222 | Fruth | May 29, 1945 |
| 2,631,723 | Ellsworth | Mar. 17, 1953 |
| 2,633,252 | Friedman | Mar. 31, 1953 |
| 2,742,146 | Lester | Apr. 17, 1956 |
| 2,792,936 | Johnson | May 21, 1957 |